United States Patent Office 3,426,259
Patented Feb. 4, 1969

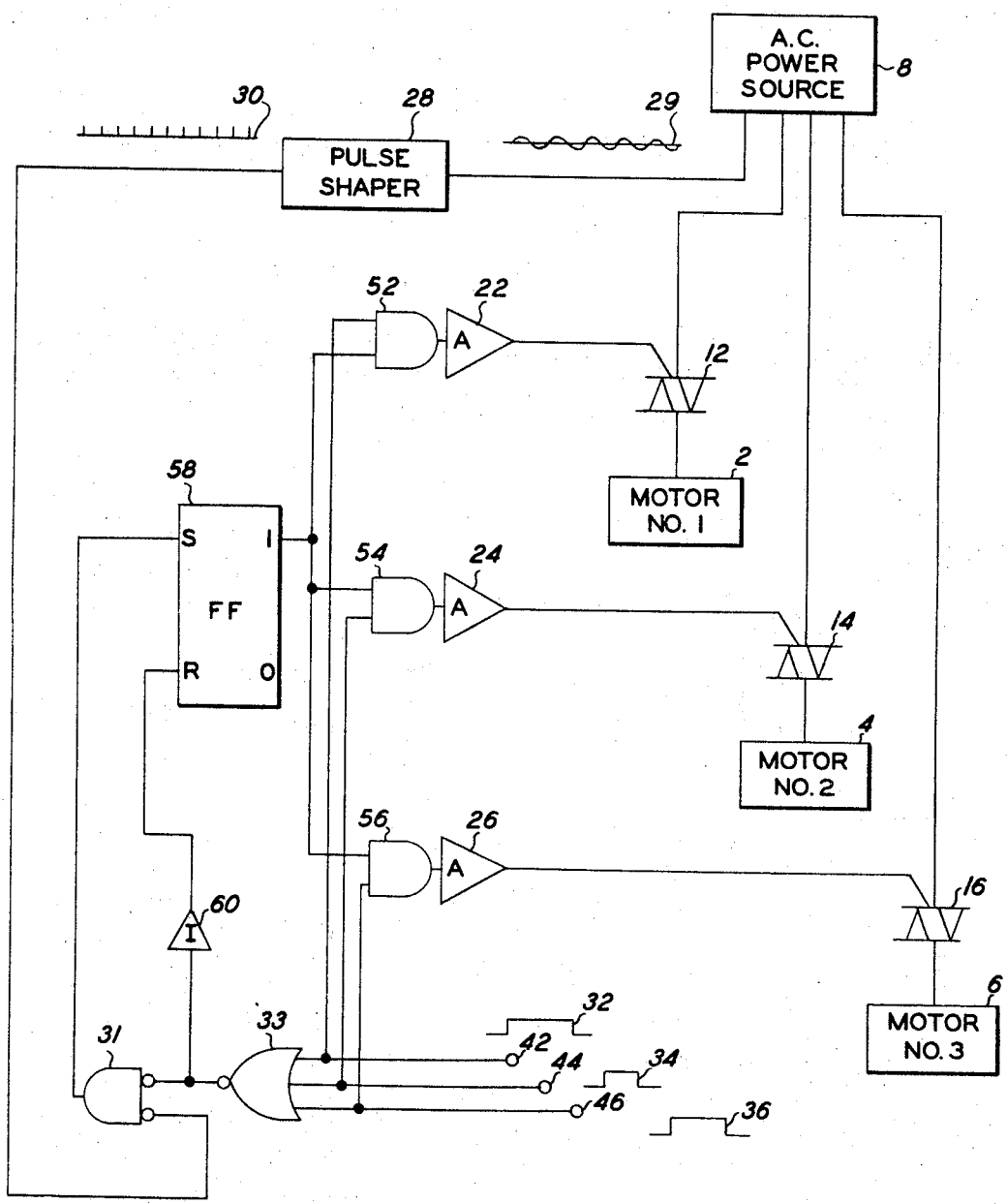

3,426,259
ELECTRIC CONTROL CIRCUITS FOR SEQUENTIAL OPERATION OF MOTIVE MEANS
Richard T. Ziehm, Webster, N.Y., assignor to Xerox Corporation, Rochester, N.Y., a corporation of New York
Filed Nov. 1, 1966, Ser. No. 591,176
U.S. Cl. 318—102           3 Claims
Int. Cl. H02p 1/58

This invention relates to electric control circuits, and, more specifically, to circuits which are time shared to control the operation of motor apparatus, for example.

At present many applications of technology require the use of precisely controlled motors for effecting a particular stage of operation in a complete apparatus. Oftentimes, a single motor may be used sequentially to perform several duties in the overall operational scheme. Also, it may be necessary instead of a single motor to use several motors, each to be sequentially and exclusively operated.

In any situation, regardless of whether one motor is used or several motors, it is necessary generally to provide precise control for the source of motive power and this control should preferably be exercised in the most reliable and economical manner.

Therefore, it is an object of the present invention to improve electric control circuits.

It is also an object of the present invention to improve electric motor control circuits.

Further, it is an object of the present invention to provide a novel and improved motor control circuit which is reliable, precise, and economical.

These and other objects as may become apparent are accomplished in accordance with the principles of the present invention wherein a sequentially actuated bistable device effectively gates energizing control pulses to apparatus to be controlled. The initial actuation of the bistable device coincides with the optimum phase angle of the power supply available to the aforementioned apparatus.

For a better understanding of the invention as well as other objects and features thereof, reference may be made to the following description of the invention to be read in connection with the accompanying drawings wherein the sole figure illustrates schematically the preferred embodiment of the present invention.

Referring specifically to the sole figure of the drawings, three alternating current (AC) motors 2, 4, and 6, for example, are supplied AC power from a suitable AC power supply 8 via individual triac elements 12, 14, and 16, respectively. The each gate electrode of these triac elements 12, 14, and 16 is individually connected to a conventional amplifier 22, 24 and 26, respectively. The inputs to these amplifiers will be referred to in more detail hereinafter.

A conventional pulse shaping circuit 28 is connected also to the AC power supply 8 and shapes the waveform 29, characteristic of the AC power into a pulse train 30 in which the positive pulses correspond in phase to the zero cross over points in the waveform 29. The pulse shaping circuit 28 may include, for example, a Schmitt trigger, a differentiating circuit and a full wave rectifying circuit in that order from its input to its output. The pulses of the waveform 30 at the output of the pulse shaper 28 are supplied to one input of a conventional AND gate 31. The other input of this AND gate 31 is connected to the output of a conventional OR gate 33.

The inputs to the OR gate 33 may, for example, be derived from various pulse generating circuits (not shown) used to generate a pulse having a width desired to operate a particular motor for a particular interval of time. As an example, pulse waveforms 32, 34 and 36 are seen in the figure to correspond as inputs applied to terminals 42, 44 and 46, respectively.

These inputs to terminals 42, 44 and 46, in addition to being applied to the inputs of OR gate 33, are also applied individually to one of three AND gates 52, 54 and 56, respectively, the outputs of which provide the input to amplifiers 22, 24 and 26, respectively.

It is understood that the pulse waveforms 32, 34 and 36 are generated sequentially for the desired sequential operation of a motor or motors such as motors 2, 4, and 6. As one of these waveforms appears at its associated input terminal it will be passed by OR gate 33 to enable the respective input of AND gate 31. Upon coincidence of this waveform at the input of AND gate 31 with a pulse from pulse train 30 at the output of the pulse shaper 28, a leading edge, or positive going signal, will be supplied to the set input of a flip-flop 58 which will place this flip-flop in a set condition. Upon the setting of this flip-flop 58, the output from its one side will be a high level signal sufficient to energize the second input to each of the three gates 52, 54 and 56. One of these gates will have present at its other input one of the pulses present at a respective one of the input terminals 42, 44 or 46.

For example, considering the situation of waveform 32 applied at terminal 42, the AND gate 52 will be enabled coincidentally with the set condition of flip-flop 58 and will pass a pulse corresponding in width to the width of the pulse in waveform 32. This waveform passed by AND gate 52 will be amplified and applied as a gating signal to the gate electrode of triac element 12. With the application of a control signal or gating signal at the gate electrode of this triac element 12, the motor 2 associated with this triac element 12 will then receive the power from the power supply 8 and will commence operation. It is noted that the commencement of operation of the motor 2 will approximately correspond to a zero cross-over point in the waveform 29 representative of the AC power supplied to this motor. Therefore, the motor will be energized at an optimum phase angle in relation to its source of AC power. As the OR gate 33 detects the trailing edge of the pulse in waveform 32 applied at terminal 42, the output from this OR gate will once again return to a low level generating a trailing edge, or a negative going signal, which, when inverted by a conventional invertor 60 connected to the reset input of flip-flop 58, becomes a leading edge or positive going signal which is sufficient to reset the flip-flop 58. Upon the resetting of flip-flop 58, the output from the one side of the flip-flop is terminated thereby terminating the gating control signal applied to the gate electrode of the triac element 12. In the absence of this gating signal, when the anode current of the triac element falls below a certain threshold for which this element is designated, the triac element 12 will cease to conduct sufficiently to continue energization of the motor 2. The characteristic of the triac element is such that when its anode current falls below a predetermined threshold, the element will cease conduction to a degree insufficient to provide continued energization of the motor 2 from the power supply 8. In this way, the motor 2 will be de-energized approximately at the zero cross-over point of the anode current supplied through the triac element to the motor.

Similarly, the pulse in waveform 34 applied at terminal 44 in sequence to the pulse in waveform 32 applied at terminal 42 will also activate and set flip-flop 58 while enabling the AND gate 54 to provide an amplified gate control signal to triac element 14. This will then effect the energization of motor 4 for a period of time approximately equal to the duration of the pulse in waveform 34. As was the case with triac element 12 and motor 2, motor 4 will also cease operation at an approximate zero current cross-over point.

The above described situations involving waveforms 32 and 34 is also true for the pulse in waveform 36 applied at terminal 46. The operation of the circuits hereinabove described will be similar in the situation of this third waveform.

The circuit as shown in the figure operates therefore to provide an effective and precise control circuit for AC motors, for example, which is reliable as well as economical. The time sharing of the control circuit by the motors 2, 4 and 6, enhance the desirability of the control circuit in that it obviates a particular control circuit for each individual motor.

The waveforms illustrated are presented for purposes of this description only and are not offered as true representations of exemplary, amplitudes, widths and frequency. It should be understood that a comparison of the frequency of the pulses in waveform 30 and the widths of the pulses in waveforms 32, 34 and 36 is generally such that the flip-flop 58 will be in a set condition for the majority of the time that a particular pulse is present at one of the terminals 42, 44 or 46.

While the invention has been described with reference to the circuit disclosed herein, it is not confined to the details set forth since it is apparent that electrical equivalent components may be substituted for the components of the preferred circuit without departing from the scope of the invention. Thus, for example, the flip-flop and gates may be replaced with other combinations of components to perform the same function as those obtained in the circuit shown in the figure.

Although reference has been made earlier to a particular number of motors, it will be apparent to one skilled in the art that any practical number of motors may be controlled by the circuit of the present invention as long as the input pulses are sequential in time. It will also be apparent that the control circuit is also adaptable to controlling a single motor which is desired to be operated in sequence corresponding to sequential input pulses to the control circuit of the present invention.

It should be understood that, although the control circuit of the figure is described in a motor control system, it will be apparent to those skilled in the art that this control circuit has useful application in controlling other systems.

Since the aforementioned triac element is a bidirectional triode thyristor which may be gate-triggered from a blocking to conducting state for either polarity of applied voltage, this device may be replaced with other control elements which exhibit similar characteristics. For example, two control rectifiers connected in parallel and oppositely poled may be substituted for this element.

The intention of the applicant is, therefore, to cover such modifications or changes as may come within the scope of the invention as defined by the following claims.

What is claimed is:
1. A circuit for controlling a plurality of sequential motive operations comprising:
   (a) a plurality of input terminals adapted to be individually coupled to a like plurality of sequential control signals, respectively;
   (b) a power terminal adapted to be coupled to a source of alternating current;
   (c) pulse shaping means coupled to said power terminal for generating pulses in substantial phase synchronism with the zero cross-over points of said alternating current;
   (d) bilateral current conducting solid state means having a current threshold value and at least two electrodes and a gate electrode for translating current applied at said power terminal above said threshold value in response to a gating signal at said gate electrode;
   (e) alternating current motive means coupled to said solid state means for receiving energizing current therefrom;
   (f) bistable means having an output terminal, a first and second stable state and responsive to a first and second signal for going from said first stable state to said second stable state and from said second to said first stable state, respectively;
   (g) first signal means for generating said first signal upon the first coincidence of one of said pulses and one of said sequential signals, and
   (h) second signal means for generating said second signal upon the termination of said one of said sequential control signals;
   (i) a plurality of gating means each individually coupled to a respective one of said input terminals and to said output terminal of said bistable means for generating a gating signal upon the coincidence of one of said sequential control signals and said second stable state in said bistable means; and,
   (j) means coupled between said plurality of gating means and said gate electrode for coupling said gating signal to said gate electrode.
2. A circuit as recited in claim 1 wherein:
   (a) said bistable means includes a flip-flop having two inputs, one of which is coupled to said gating means and the other of which is coupled to said second signal means; and,
   (b) said second signal means includes an inverter means coupled to said input terminals for polarity inverting said sequential control signals.
3. A circuit as defined in claim 2 wherein:
   (a) said bilateral current conducting solid state means includes a plurality of triac elements equal in number to the plurality of said input terminals;
   (b) said alternating current motive means includes a plurality of alternating current motive apparatus equal in number to the plurality of said input terminals.

References Cited

UNITED STATES PATENTS

| 2,881,832 | 4/1959 | Leonard | 307—41 |
| 3,268,785 | 8/1966 | Gerber et al. | 318—102 X |
| 3,337,741 | 8/1967 | Mislan | 307—41 |

ORIS L. RADER, *Primary Examiner.*

B. A. COOPER, *Assistant Examiner.*

U.S. Cl. X.R.

307—41